(12) United States Patent
Stojkovic et al.

(10) Patent No.: US 10,150,517 B2
(45) Date of Patent: Dec. 11, 2018

(54) VEHICLE ROOF STRUCTURE CORNER CONNECTOR

(71) Applicant: FORD GLOBAL TECHNOLOGIES, LLC, Dearborn, MI (US)

(72) Inventors: Dragan B. Stojkovic, Taylor, MI (US); Jon A. Wilcox, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 15/420,316

(22) Filed: Jan. 31, 2017

(65) Prior Publication Data

US 2018/0215419 A1   Aug. 2, 2018

(51) Int. Cl.
*B62D 27/02* (2006.01)
*B62D 25/04* (2006.01)
*B62D 25/06* (2006.01)

(52) U.S. Cl.
CPC ........... *B62D 27/023* (2013.01); *B62D 25/04* (2013.01); *B62D 25/06* (2013.01)

(58) Field of Classification Search
CPC ....... B62D 27/023; B62D 25/04; B62D 25/06
See application file for complete search history.

(56) References Cited

U.S. PATENT DOCUMENTS

| 7,431,378 | B2 | 10/2008 | Chen et al. |
| 9,884,654 | B1* | 2/2018 | Stojkovic ............... B62D 25/06 |
| 2013/0049405 | A1 | 2/2013 | Kurogi |
| 2016/0297479 | A1 | 10/2016 | Ritschel et al. |

FOREIGN PATENT DOCUMENTS

JP   2006069282   3/2006

* cited by examiner

*Primary Examiner* — D Glenn Dayoan
*Assistant Examiner* — Melissa A Black
(74) *Attorney, Agent, or Firm* — Jason Rogers; Brooks Kushman P.C.

(57) ABSTRACT

A vehicle body includes a longitudinal roof spine and a plurality of roof bows extending laterally from the roof spine to a plurality of pillars that extend upwardly from a lower body structure. The roof bows and pillars are connected by corner connectors that include a plug end that is received in an opening defined at an outer end of the roof bow. The opening is defined in a bottom wall of the outer end of the roof bow and is assembled over and supported by the plug end. The opening in the bottom wall of the roof bow is defined between the two side walls.

20 Claims, 5 Drawing Sheets

VEHICLE ROOF STRUCTURE CORNER CONNECTOR

TECHNICAL FIELD

This disclosure relates to a corner connector that connects a roof bow to a pillar of a vehicle body.

BACKGROUND

Automotive vehicles have a passenger compartment that is covered by a roof supported on a plurality of pillars that are separated by windows and doors. Traditional vehicle designs generally include a roof rail that extends above the windows and doors. The roof rails on right and left sides of the roof are connected by bows that extend between the right and left roof rails. A roof panel is supported by the roof rails and bows.

One problem with traditional roof designs is that it is difficult to provide expansive windows or sunroofs in the roof while meeting all of the crash tests and roof crush requirements. Generally, the extent of openings in the roof must be limited to meet the requirements for the strength of roof rails and roof bows used to support the roof panel.

Traditional roof designs also limit vehicle design options to traditional coupe and sedan styles. There is a need for new designs for vehicles that are adapted to maximize the use of new materials and manufacturing processes. In addition, new powertrain and traction motor systems are impacting overall vehicle design and are providing new challenges and expanding the options available for vehicle body design.

This disclosure is directed to solving the above problems and other problems as summarized below.

SUMMARY

According to one aspect of this disclosure, a vehicle body is disclosed that comprises a longitudinal roof spine and a plurality of roof bows extending laterally from the roof spine to a plurality of pillars that extend upwardly from a lower body structure. The roof bows and pillars are connected by corner connectors that include a plug end that is received in an opening defined at an outer end of the roof bow that is assembled over the plug end. The opening in the roof bow is defined between the two side walls.

According to another aspect of this disclosure, a corner connector is disclosed for a vehicle roof including a pillar and a roof bow defining a opening in a bottom wall at a distal end of the roof bow. The corner connector comprises a pillar plug received in an upper end of the pillar and a bow plug received in an outer end of the roof bow. The bow plug is received in the opening in the bottom wall of the roof bow with three surfaces of the bow plug abutting the roof bow.

According to another aspect of this disclosure, a roof bow for a vehicle roof is disclosed that includes a pillar connected to a corner connector having a bow plug. The roof bow has a top wall and a pair of side walls extending below opposite longitudinally spaced edges of the top wall. The roof bow also includes a bottom wall connecting lower edges of the side walls that define a base opening at a distal end of the roof bow. The bow plug is adapted to be received in the base opening between the side walls.

According to other aspects of this disclosure the plug end may have a rectangular longitudinal cross-section that has a reduced height and width compared to the height and width of the abutment face portion of the corner casting from which the plug end extends.

The plug end is received within the outer end of the roof bows and includes an upper portion and two side portions. The top wall is received on the upper portion and the two side portions are received within and contact the two side walls. An adhesive may be applied between the top wall and the upper portion and between the two side portions and the two side walls. Alternatively, or in addition, a plurality of fasteners may be used to attach the two side walls to the two side portions.

The vehicle body may further comprise a lower portion of the plug end extending between the two side portions that includes a tongue transversely extending toward the roof spine and supporting a bottom wall of the roof bow that spans the area between the two side walls adjacent the bottom opening and extends to a limited extent toward the roof spine.

The vehicle wherein the two side walls each further include a window support flange that extends in opposite longitudinal directions from outer surfaces of the side walls.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
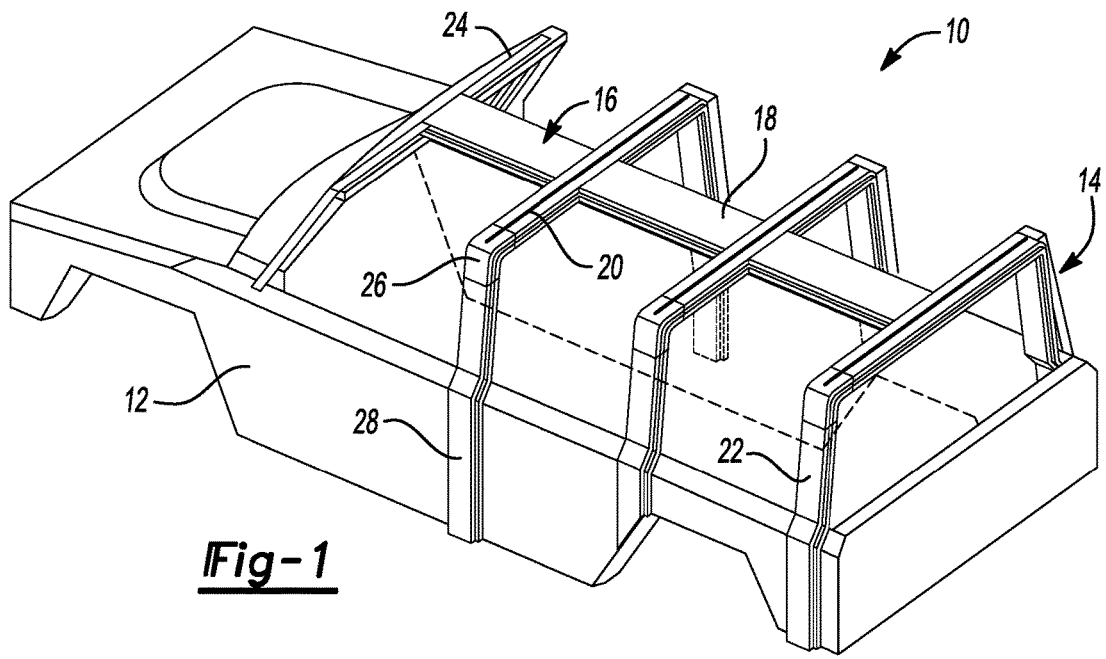
FIG. 1 is a left/rear perspective view of a roof support structure attached to a diagrammatic representation of a lower body structure for a vehicle.
Figure 2:
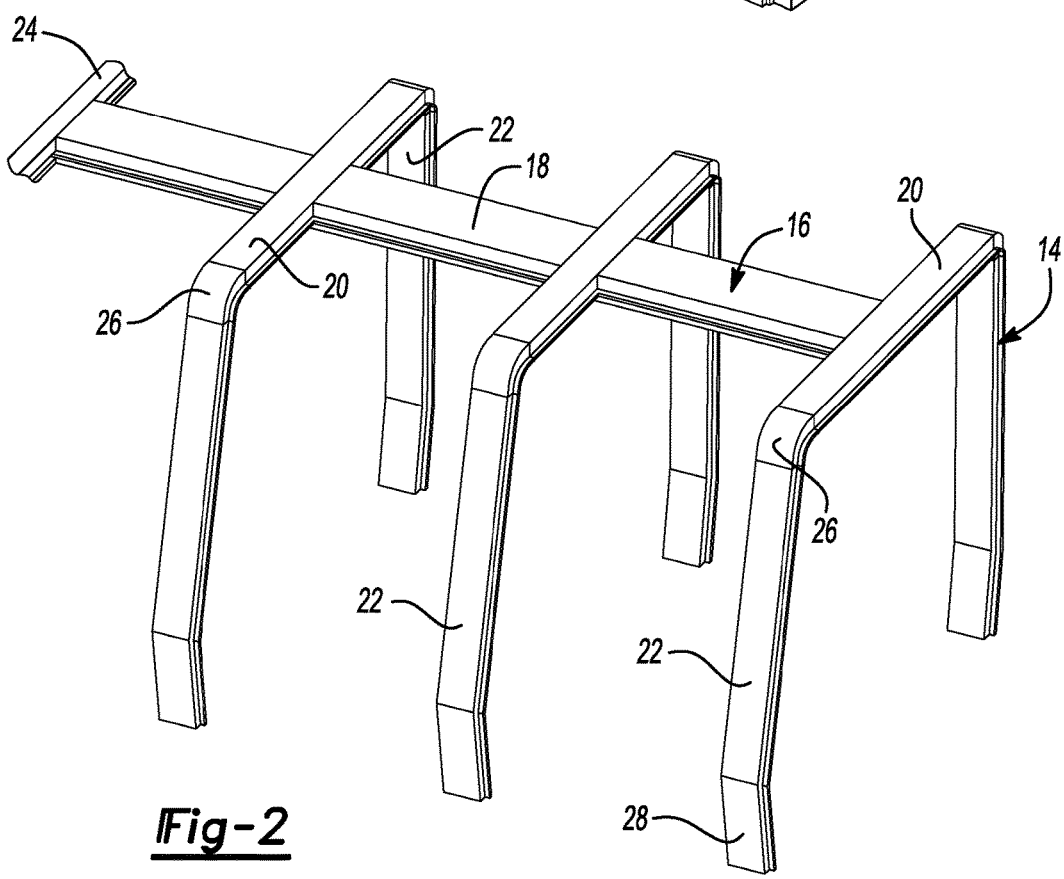
FIG. 2 is a left/rear perspective view of a roof support structure.

Referring to FIGS. 1 and 2, a vehicle body structure 10 is illustrated diagrammatically. An outline of a lower body structure 12 is shown supporting a roof support structure generally indicated by reference numeral 14. The roof support structure 14 includes a spine 16 that extends longitudinally and is aligned with the center of the vehicle. In the embodiment of FIGS. 1 and 2, the spine 16 is made up of a plurality of longitudinal connecting plates 18 that are connected to adjacent roof bows 20. The roof bows 20 are aligned with and connected to pillars 22 as will be described below.

A windshield header 24 is attached to the front end of the spine 16 and is supported by a pillar 22 that is commonly referred to as a A-pillar. The other pillars 22 are frequently referred to as the B, C and D pillars.

Corner connecters 26, or corner castings, are assembled between the pillars 22 and the roof bows 20 for the B, C and D pillars. A corner connector 26 of a modified design may be provided to connect the windshield header 24 to the A pillar 22. The pillars 22 are secured on their lower ends to lower pillars 28 that are supported by or are integrally formed as part of the lower body structure 12. The lower pillars 28 extend between the vehicle chassis (not shown) and the pillars 22. The pillars 22 extend between the windows or body panels of the vehicle below the roof.

Figure 3:
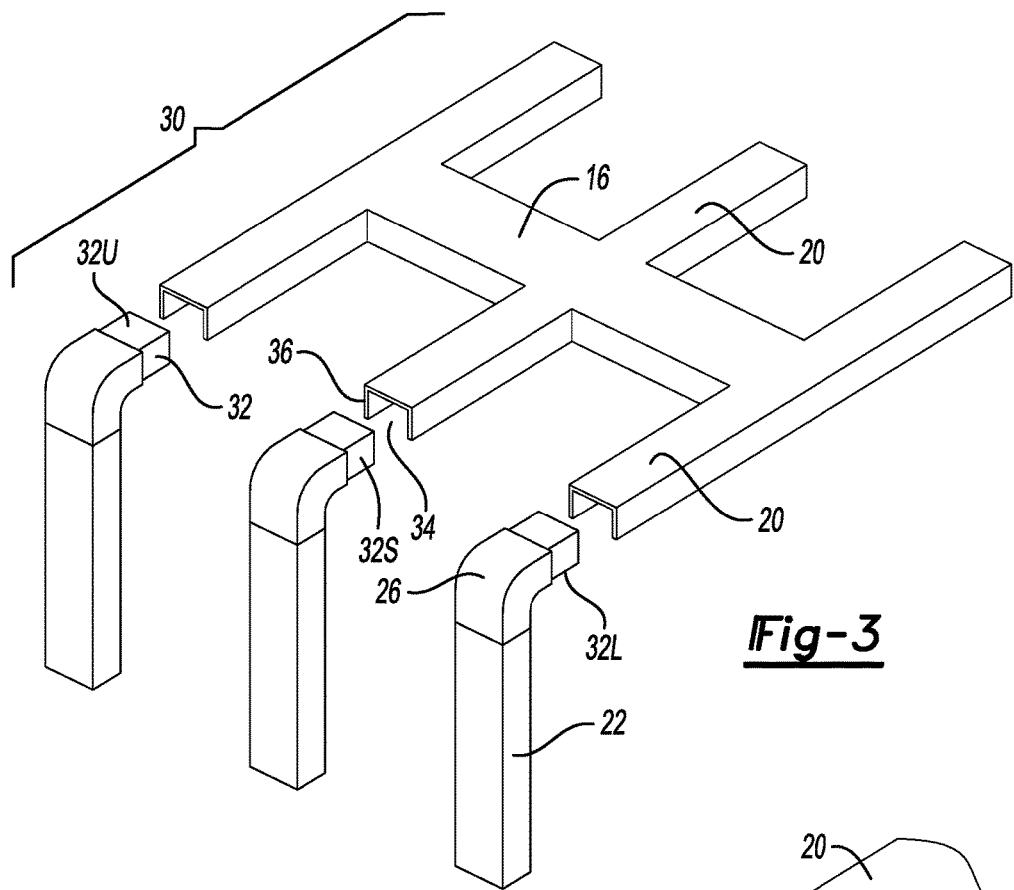
FIG. 3 is an exploded perspective view of a roof spine and attached roof bows with roof support pillars and corner castings separated from the bows.

Referring to FIG. 3, an integral spine/bow roof support 30 is generally indicated by reference numeral 30. The same reference numerals are used for corresponding parts of the roof support structure in the different disclosed embodiments. The integral spine/bow roof support 30 includes a spine 16 and a plurality of integral roof bows 20. Corner connectors 26 are shown to include a plug end 32 that is received in an opening 34 formed at an outer end 36 of each of the roof bows 20. The plug end 32 includes an upper surface 32U, a lower surface 32L and two side surfaces 32S. The outer end 36 of each roof bow 20 have a top wall 35 that is supported on the plug end 32. Each plug end 32 is inserted through the bottom opening 34 defined by a bottom wall 37 of the outer end 36 of each roof bow 20.

Figure 4:
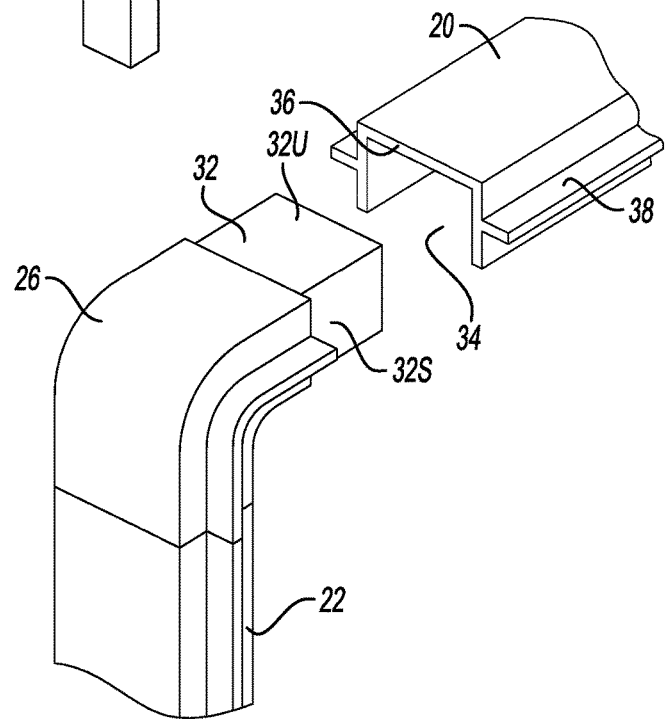
FIG. 4 is a fragmentary perspective view of one partial roof bow, part of one pillar and one corner casting.

Referring to FIG. 4, a pillar 22 is shown with a corner connector 26 received in an upper end of the pillar 22. The plug end 32 of the corner connector 26 is shown separated from but aligned with the opening 34 formed on the outer end 36 of the roof bow 20. A window support flange is shown extending from fore and aft sides of the roof bow 20. The window support flanges 38 may also support a seal (not shown) that may be provided to form a seal at the interface between the roof bow 20 and a window (not shown) assembled between adjacent roof bows 20.

Figure 5:
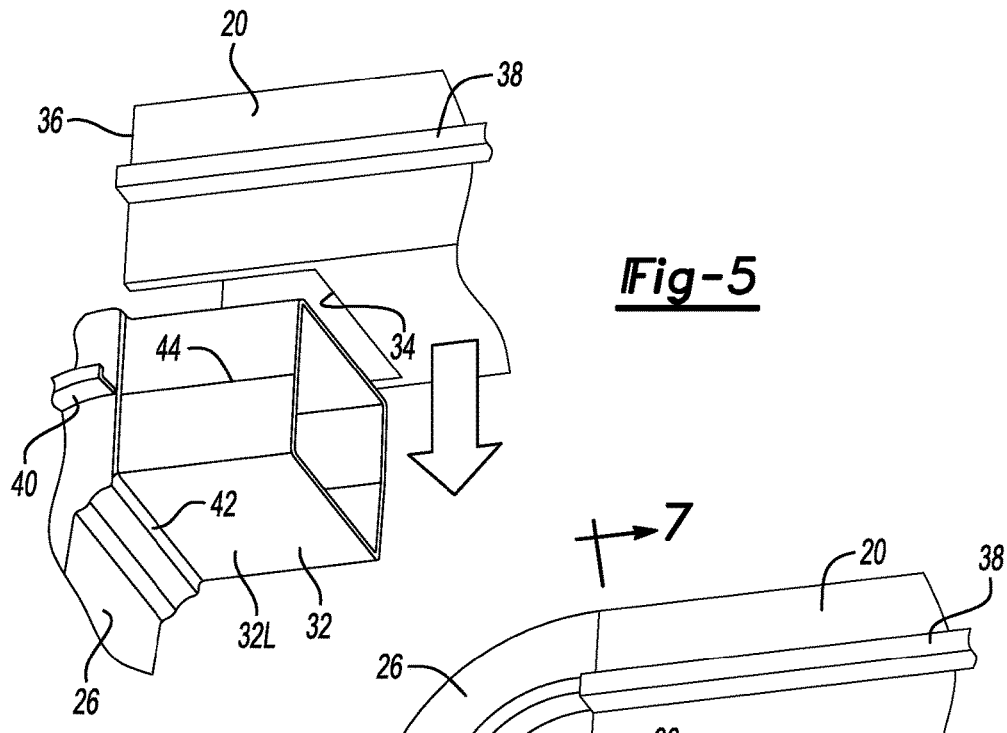
FIG. 5 is a fragmentary perspective view of one partial roof bow and one corner casting with an arrow showing the roof bow being assembled to the corner casting.
Figure 6:
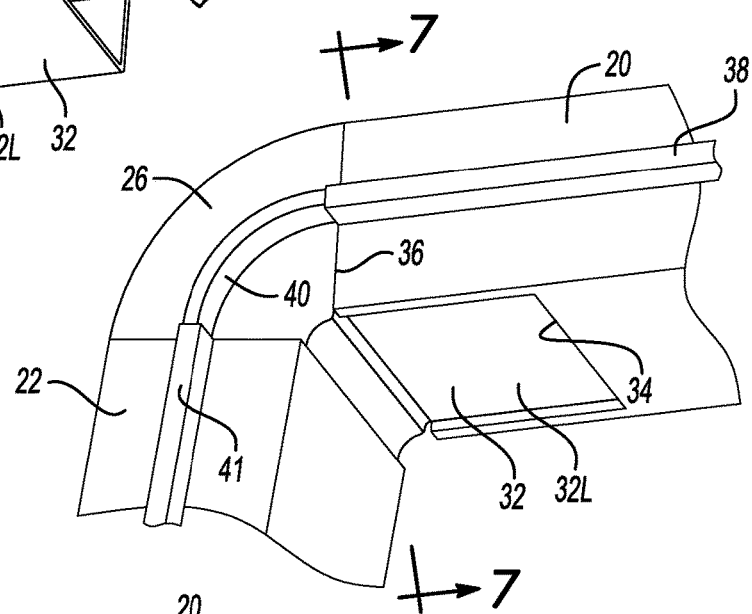
FIG. 6 is a fragmentary perspective view of one partial roof bow and one corner casting after being assembled to the corner casting.

Referring to FIGS. 5 and 6, the process for assembling the roof bow 20 to the plug end 32 of the corner connector 26 is illustrated. The arrow pointing downwardly in FIG. 5 illustrates the direction of movement of the roof bow as it is assembled over the end plug 32 through the opening 34 in the outer end 36 of the roof bow 20. A window support flange 38 is shown on one side of the roof bow 20. The window support flange 38 is aligned with a window support flange 40 provided on the corner connector 26. Another window support flange 41 may be provided on the side of the pillar 22 and aligned with the window flange 40 of the corner connector 26.

The plug end 32 extends from the corner connector 26 with a abutment face 42 being provided where the plug end 32 is attached to the corner connector 26. A parting line 44 may be provided on the plug end 32. The parting line 44 may be formed as a result of the draft angle necessary to form the corner connector 26 as a casting.

The outer surfaces of the roof bow 20, corner connector 26 and pillars 22 are preferably flush with each other to provide a smooth outer appearance and reduce the potential for any wind noise. However, it should be understood that the roof bows 20 and pillars 22 may each define a step with corner connector 26 if desired to provide a more rugged appearance.

As shown in FIG. 6, the plug end 32 is shown fully inserted within the opening 34 in the bottom of the roof bow at the outer end 36. The window support flange 38 is aligned with the window support flange 40 on the corner casting 26.

Figure 7:
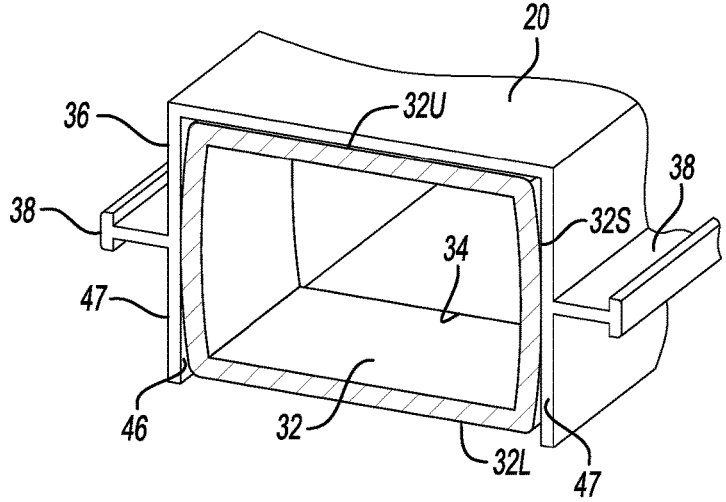
FIG. 7 is a cross sectional view taken along the line 7-7 in FIG. 6.
Figure 8:
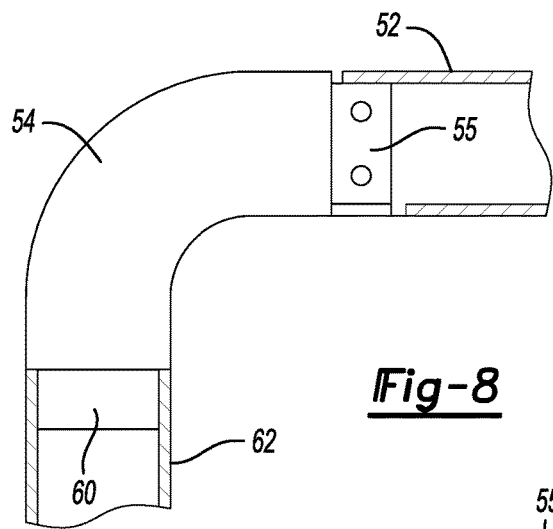
FIG. 8 is a fragmentary diagrammatic rear elevation view partially in cross section of another alternative design for one partial roof bow, a partial pillar and another alternative design for one corner casting assembled together.
Figure 9:
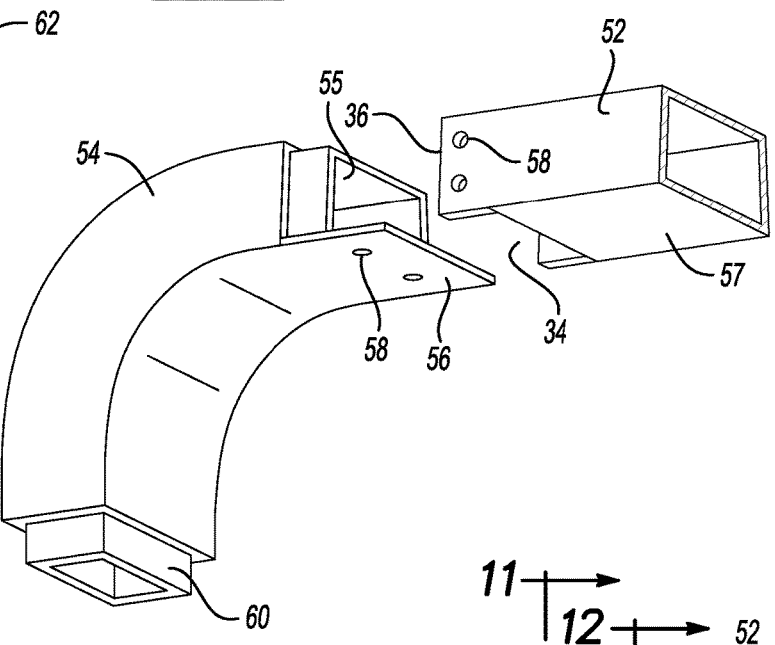
FIG. 9 is an exploded perspective view of a partial roof bow and corner casting of the design shown in FIG. 8.
Figure 10:
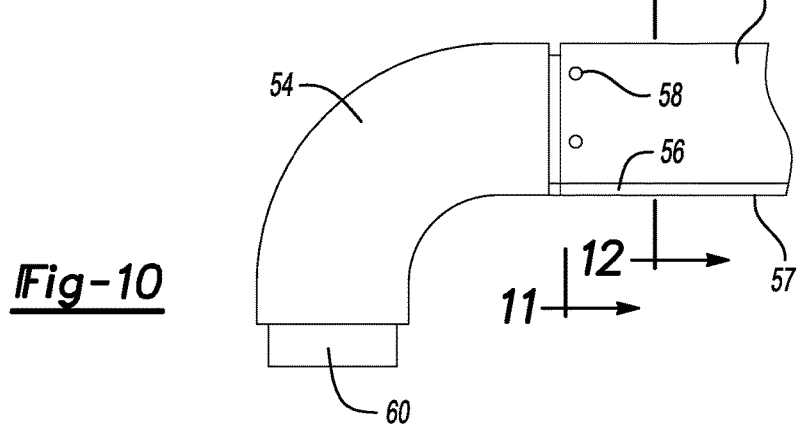
FIG. 10 is a fragmentary rear elevation view of a partial roof bow and corner casting of the design shown in FIG. 8.
Figure 11:
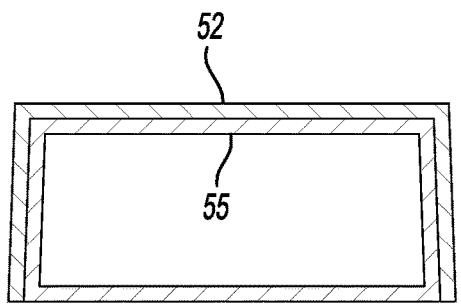
FIG. 11 is a cross sectional view taken along the line 11-11 in FIG. 10.
Figure 12:
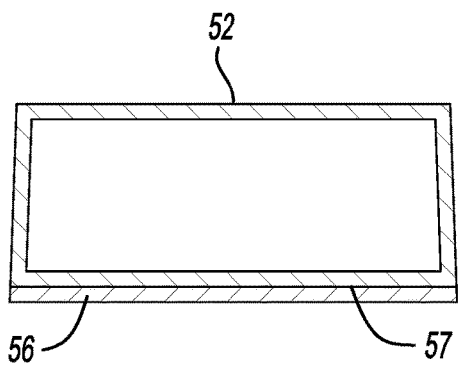
FIG. 12 is a cross sectional view taken along the line 12-12 in FIG. 10.
Figure 13:
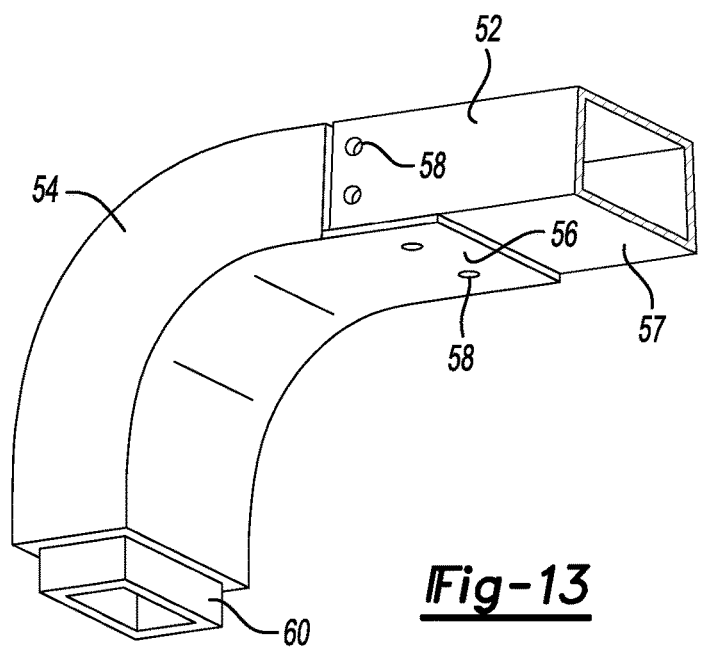
FIG. 13 is a perspective view of the partial roof bow assembled to the corner casting of the design shown in FIG. 8.

Referring to FIG. 7, a cross section is taken at the outer end 36 of the roof bow 22. Window support flanges 38 are provided on fore and aft sides of the roof bow 20 and the plug end 32 is shown fully inserted in the opening 34. An adhesive gap 46 may be provided on opposite sides of the plug 32 between the plug 32 and the side walls 47 of the roof bow 20. The side walls 47 may be referred to as right and left sidewall as viewed from the side of the vehicle or may also be referred to as fore and aft side walls.

Referring to FIGS. 8-13, another alternative embodiment is shown that includes an alternative design of a roof bow 52 that includes an opening 34 at its outer end 36. The corner casting 54 includes a roof bow plug 55 that is received within the opening 34 in the outer end 36 of the roof bow 52. A lower tongue 56 extends from the distal end of the bow plug 55. A lower surface 57 of the roof bow 52 rests on the rearward of the opening 34 rests on the lower tongue 56 to provide additional support for the roof bow 52.

A plurality of holes 58 are shown on the bow plug 55, the roof bow 52 and the lower tongue 56. The holes 58 may be formed in the parts before assembly or they may be formed as a result of inserting blind rivets, conventional rivets or flow drill screws into the areas that are pictured as openings in FIGS. 8, 9, 10 and 13. The fastener may be used in addition to or instead of adhesives to join the roof bow 52 to the corner connector 54.

A pillar plug 60 is provided in a lower end of the corner connector 54. The pillar plug 60 is adapted to be received in the upper end of a pillar 62. Fasteners or adhesives may be used to secure the pillar plug 60 of the corner connector 54 inside the pillar 62.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle body comprising:
a longitudinal roof spine;
roof bows extending laterally from the roof spine to an outer end having a top wall and two side walls that define a bottom opening;
pillars extending upward from a lower body structure; and
corner castings each connecting a pillar to a roof bow and having a plug end, wherein the outer end of the roof bow is assembled over the plug end.

2. The vehicle body of claim 1 wherein the plug end has a rectangular longitudinal cross-section that has a reduced height and width compared to the height and width of an abutment face portion of the corner casting from which the plug end extends.

3. The vehicle body of claim 1 wherein the plug end is adapted to be received within the outer end of the roof bows, the plug end includes an upper portion and two side portions, wherein the top wall is received on the upper portion and the two side portions are received within and contact the two side walls.

4. The vehicle body of claim 3 further comprising:
an adhesive applied between the top wall and the upper portion and the two side portions and the two side walls.

5. The vehicle body of claim 3 further comprising:
a plurality of fasteners attaching the two side walls and the two side portions.

6. The vehicle body of claim 3 further comprising:
a lower portion of the plug end extending between the two side portions and including a tongue transversely extending toward the roof spine and supporting a bottom wall of the roof bow that spans the area between the two side walls adjacent the bottom opening and extending to a limited extent toward the roof spine.

7. The vehicle body of claim 1 wherein the two side walls each include a window support flange that extends in opposite longitudinal directions from outer surfaces of the side walls.

8. A corner connector for a vehicle roof including a pillar and a roof bow defining a opening in a bottom wall at a distal end of the roof bow, comprising:
a pillar plug received in an upper end of the pillar; and
a bow plug received in an outer end of the roof bow, the plug being received in the opening with three surfaces of the bow plug abutting three walls of the roof bow.

9. The corner casting of claim 8 wherein the three walls of the roof bow are a top wall, a right side wall and a left side wall, wherein the three surfaces of the bow plug abutting the three walls of the roof bow are a top surface, a right side surface and a left side surface.

10. The corner casting of claim 9 wherein the bow plug has a rectangular longitudinal cross-section that has a reduced height and width compared to the height and width of an abutment face portion of the corner casting from which the bow plug extends.

11. The corner casting of claim 9 wherein the bow plug is received within the outer end and the three surfaces include an upper surface and two side surfaces, wherein the top wall is received on the upper surface and the two side surfaces are received within and contact the right side wall and the left side wall.

12. The corner casting of claim 11 further comprising:
an adhesive applied between the top wall and the upper surface and between the two side surfaces and the right side wall and the left side wall, respectively.

13. The corner casting of claim 11 further comprising:
a plurality of fasteners attaching the two side surfaces to the right side wall and the left side wall, respectively.

14. The corner casting of claim 11 further comprising:
a lower portion of the bow plug extending between the two side surfaces and including a tongue transversely extending toward a roof spine and supporting a bottom wall of the roof bow that spans the area between the right side wall and the left side wall between the bottom opening and extends to a limited extent toward the roof spine.

15. The corner casting of claim 8 wherein the three walls of the roof bow include two side walls that each include a window support flange that extends in opposite longitudinal directions from the side walls.

16. A roof bow for a vehicle roof including a pillar connected to a corner connector having a bow plug, comprising:
a top wall;
a pair of side walls extending below opposite longitudinally spaced edges of the top wall; and
a bottom wall connecting lower edges of the side walls and defining a base opening at a distal end of the roof bow, the bow plug being received in the base opening between the side walls.

17. The roof bow of claim 16 wherein the bow plug abuts the top wall and the side walls of the roof bow.

18. The roof bow of claim 16 wherein the bow plug is received within the distal end and includes an upper surface and two side surfaces, wherein the top wall is received on the upper surface and the two side surfaces are received within and contact one of the pair of side walls.

19. The roof bow of claim 18 further comprising:
a lower portion of the bow plug extending between the two side surfaces and including a tongue that spans the area between the pair of side walls across the bottom opening and transversely extends below the bottom wall of the roof bow to a limited extent.

20. The roof bow of claim 16 wherein the pair of side walls each include a window support flange that extends in opposite longitudinal directions from outer surfaces of the side walls.

* * * * *